United States Patent
Jeol et al.

(10) Patent No.: US 9,296,876 B2
(45) Date of Patent: Mar. 29, 2016

(54) STABILIZED POLYAMIDE COMPOSITIONS

(75) Inventors: Stéphane Jeol, Cumming, GA (US); Thierry Badel, Lyons (FR)

(73) Assignee: RHODIA OPERATIONS, Aubersvilliers (FR)

(*) Notice: Subject to any disclaimer, the term of this patent is extended or adjusted under 35 U.S.C. 154(b) by 0 days.

(21) Appl. No.: 14/110,883

(22) PCT Filed: Apr. 12, 2012

(86) PCT No.: PCT/EP2012/056603
§ 371 (c)(1),
(2), (4) Date: Apr. 2, 2014

(87) PCT Pub. No.: WO2012/140099
PCT Pub. Date: Oct. 18, 2012

(65) Prior Publication Data
US 2014/0323628 A1    Oct. 30, 2014

(30) Foreign Application Priority Data

Apr. 13, 2011   (FR) ..................... 11 01123

(51) Int. Cl.
*C08L 77/00* (2006.01)
*C08K 5/17* (2006.01)
*C08L 77/02* (2006.01)
*C08L 77/06* (2006.01)
*C08G 69/48* (2006.01)

(52) U.S. Cl.
CPC . *C08K 5/17* (2013.01); *C08G 69/48* (2013.01); *C08L 77/02* (2013.01); *C08L 77/06* (2013.01)

(58) Field of Classification Search
CPC .................. C08K 5/17; C08L 77/00
USPC ............................................. 525/419
See application file for complete search history.

(56) References Cited

U.S. PATENT DOCUMENTS

| | | |
|---|---|---|
| 3,160,611 A | 12/1964 | Runge |
| 3,168,498 A | 2/1965 | Runge |
| RE34,447 E * | 11/1993 | Poppe et al. .................. 524/606 |
| 6,160,080 A | 12/2000 | Cucinella et al. |
| 6,525,166 B1 | 2/2003 | Di Silvestro et al. |
| 2008/0146704 A1 | 6/2008 | Kumaraswamy et al. |

FOREIGN PATENT DOCUMENTS

| | | |
|---|---|---|
| EP | 359129 A2 | 3/1990 |
| FR | 1296778 A | 6/1962 |
| FR | 1298533 A | 7/1962 |
| FR | 2357594 A1 | 2/1978 |
| GB | 913297 * | 12/1962 |
| GB | 1532603 | 11/1978 |
| JP | 62057423 A | 3/1987 |
| WO | 9724388 A1 | 7/1997 |
| WO | 9964496 A1 | 12/1999 |

OTHER PUBLICATIONS

Standard ISO 11443, "Plastics—Determination of the Fluidity of Plastics Using Capillary and Slit-Die Rheometers—Second edition", 2005, 34 pp.

* cited by examiner

*Primary Examiner* — Kuo-Liang Peng

(57) ABSTRACT

The invention relates to a polyamide that is stabilized toward heat, light and/or bad weather by using a compound comprising at least one amine function and at least two aliphatic hydroxyl functions. The stabilizing compound may also be added to the polyamide to form stabilized polyamide compositions.

17 Claims, No Drawings

STABILIZED POLYAMIDE COMPOSITIONS

RELATED APPLICATIONS

This application is a U.S. national stage entry under 35 U.S.C. §371 of International Application No. PCT/EP2012/056603, filed Apr. 12, 2012, which claims priority to French Application No. 1101123 filed on Apr. 13, 2011. The entire contents of these applications are explicitly incorporated herein by this reference.

The invention relates to a polyamide that is stabilized toward heat, light and/or bad weather by using a compound comprising at least one amine function and at least two aliphatic hydroxyl functions. The stabilizing compound may also be added to the polyamide to form stabilized polyamide compositions.

Polyamide is a synthetic polymer widely used for the manufacture of various articles, such as molded and/or injection-molded parts. Polyamide can undergo degradations when it is subjected to external elements or conditions such as UV rays, heat and/or inclement weather. Degradations can also be induced by the heat used during production thereof and/or forming thereof. This instability is reflected by degradations, loss of mechanical properties, and changes in color. These problems can become critical for a certain number of applications, such as, in particular, parts in the motor vehicle industry which are in particular subjected to considerable heat.

In order to improve the stability of polyamides with respect to heat, it is known practice to combine them with particular stabilizers. Many additives are sold for this purpose. The use of copper iodide, in particular in combination with potassium iodide, which is used in most cases and which provides good stabilization properties, is, for example, known. It is also known practice to use more complex additives, such as hindered phenolic antioxidant compounds, stabilizers bearing at least one hindered amine unit of HALS type, or phosphorus-containing stabilizers.

However, there is a need to obtain polyamide compositions which are even more effective in terms of stabilization with respect to heat, and which are less expensive.

The Applicant has developed a novel polyamide composition that makes it possible to obtain excellent maintenance of the mechanical properties after long exposure to heat, light and/or bad weather, by using a compound containing at least one amine function and at least two aliphatic hydroxyl functions. When added to the polyamide, such a compound may become chemically covalently bonded and/or may be found diluted in the polyamide matrix with the polyamide chains either by reaction with the end groups of carboxylic acid type or by reaction with the intracatenary amides. The composition obtained especially has a good compromise of mechanical and rheological properties and especially increased melt fluidity.

The present invention also relates to a composition obtained by mixing at least:
a thermoplastic polyamide resin; and
a compound of formula (I) represented by the formula:

$$(R_1)NH-R-(OH)_n \qquad (I)$$

in which:
n is greater than or equal to 2, in particular n is 3 or 4; or n is greater than or equal to 1 in the case where $R_1$ bears an alcohol function, in particular $R_1$ bears an alcohol function and n is 1, 2 or 3;

R is a substituted or unsubstituted aliphatic, cycloaliphatic or arylalkyl hydrocarbon-based radical, optionally comprising heteroatoms such as N, S, O and/or P; and
$R_1$ may be a hydrogen atom or a substituted or unsubstituted aliphatic hydrocarbon-based radical, optionally comprising heteroatoms such as N, S, O and/or P.

For the purposes of the present invention, the term "alkylaryl" means that the OH groups are borne by aliphatic carbon atoms.

In the case where the radical $R_1$ bears at least one alcohol function, then n may be equal to 1.

According to a particular embodiment, the composition also comprises at least one filler, especially a reinforcing filler, in particular as defined below, at least one flame retardant, in particular as defined below, and/or at least one additive, in particular as defined below, these compounds possibly being present in contents as presented in the description.

In particular, the alcohol functions, represented by —OH in formula (I), are borne by aliphatic carbons. The compound of formula (I) is therefore not a compound of phenol type.

Most particularly, the amine function of the compound of formula (I) is a primary amine function, i.e. it corresponds to the case where $R_1$=H and where the compound of formula (I) is $(HO)_n-R-NH_2$.

The resulting composition may especially comprise polyamide chains comprising covalently bonded residues of compound of formula (I), chains of polyamide not bonded with a residue of compound of formula (I) and free compounds of formula (I) diluted in the polyamide matrix.

The mole proportion of compound of formula (I) covalently bonded to the polyamide is preferentially between 10% and 100% and more preferentially between 30% and 70%. The mole proportion of bonded polyhydric alcohol compound is especially calculated via the ratio of the number of moles of bonded polyhydric alcohol compound to the total number of moles of polyhydric alcohol compound.

In particular, the covalent bonds may make it possible to reduce, limit or even prevent the phenomena leading to "washing" of the compound of formula (I) from the composition. This may be particularly useful in the case of parts that are in contact with hot liquids, such as parts in a cooling circuit.

The present invention also relates to the use of the compound of formula (I) as a stabilizer for the polyamide toward heat, light and/or bad weather. In particular, this is a stabilizing effect toward aging mediated by heat, light and/or bad weather. The compound of formula (I) may also be used as an agent for fluidizing the composition, especially as an agent for fluidizing the molten composition, in particular relative to the spiral test.

n is preferentially between 2 and 20 and particularly between 3 and 7. Most particularly, the compound of formula (I) is an aminotriol or an aminotetraol.

R preferentially comprises from 2 to 20 carbon atoms and more preferentially from 4 to 10 carbon atoms.

The cycloaliphatic radical R may especially be cyclohexane.

The radical R may be substituted, for example, with various groups, for instance an amine function, a thiol function or a halogen, for instance Cl, F, Br or I.

R preferentially corresponds to a linear or branched hydrocarbon-based aliphatic chain optionally comprising heteroatoms such as N, S, O and/or P. The compound of formula (I) according to the invention may also comprise other amine functions, such as primary, secondary and/or tertiary amines.

Advantageously, the aliphatic hydroxyl functions of the compounds of formula (I) are not hindered, i.e., for example, the carbon atoms alpha to the aliphatic hydroxyl function are preferably not substituted with bulky substituents, such as branched alkyls.

The compound of formula (I) is preferentially chosen from the group comprising: tris(hydroxymethyl)aminomethane (RN CAS: 77-86-1), 3-amino-1,2-propanediol (RN CAS: 616-30-8), 2-amino-1,3-propanediol (RN CAS: 534-03-2), 2-amino-2-methyl-1,3-propanediol (RN CAS: 115-69-5), 3-methylamino-1,2-propanediol (RN CAS: 40137-22-2), diethanolamine (RN CAS: 111-42-2), bis(2-hydroxypropyl)amine (RN CAS: 110-97-4), N,N'-bis(2-hydroxyethyl)ethylenediamine, aminopropyldiethanolamine (RN CAS: 4985-85-7) and/or salts thereof.

Salts that may especially be mentioned include ammonium chlorides, ammonium bromides, ammonium sulfates, ammonium sulfonates and ammonium phosphates.

Particular examples that may be mentioned include diethanolamine hydrochloride, 2-amino-1,3-propanediol hydrochloride and tris(hydroxymethyl)aminomethane hydrochloride.

The compound of formula (I) may also be a polymer comprising amine functions and aliphatic hydroxyl functions, for instance vinyl alcohol polymers comprising one or more amine functions, for instance the vinyl alcohol/vinylamine copolymer known especially under the name Erkol®.

From 0.05% to 20% by weight of compound of formula (I), relative to the total weight of the composition, preferentially from 0.5% to 10% by weight, even more preferentially from 1% to 5% by weight or even from 1.2% to 2.5% by weight, may especially be added to the polyamide composition.

From 0.05% to 20% by weight of compound of formula (I), relative to the total weight of the polyamide, especially from 0.5% to 10% by weight, in particular from 1% to 7% by weight or even from 1.5% to 5% by weight, may especially be added.

According to a particular embodiment, the compound of formula (I) is present:

in a content ranging from 1.4% to 5% by weight and especially from 1.6% to 4% by weight, relative to the total weight of the composition, and/or in a content ranging from 2% to 6% by weight and especially from 2.5% to 5% by weight, relative to the total weight of the polyamide.

The composition may show an improvement in its performance relative to the ultimate tensile strength and/or the unnotched Charply impact strength after aging for 500 h and in particular for 1000 h, at 170° C.

The composition according to the invention may have:

an ultimate tensile strength retention of at least 50%, especially of at least 70% and in particular of at least 80% after 500 h of aging at 210° C., and/or an ultimate tensile strength retention of at least 50%, especially of at least 65% and in particular of at least 80% after 1000 h of aging at 210° C.

The composition according to the invention may have:

an unnotched Charpy impact strength retention of at least 40%, especially of at least 60% and in particular of at least 70% after 500 h of aging at 210° C., and/or an unnotched Charpy impact strength retention of at least 40%, especially of at least 50% and in particular of at least 60% after 1000 h of aging at 210° C.

Moreover, the composition may show an improvement in the mean flow length, Spiral test, of at least 150%, especially of at least 200%, or even of at least 250%, relative to a composition lacking a compound of formula (I) and a compound of polyol type, such as DPE or dipentaerythritol.

In particular, the composition shows an improvement in the mean flow length, in particular according to the Spiral test, of at least 150% relative to a composition comprising an identical weight amount of DPE.

The ultimate tensile strength, the unnotched Charpy impact strength and the mean flow length, according to the Spiral test, mentioned above are measured in accordance with the protocols presented in the examples.

The polyamide of the invention is especially chosen from the group comprising polyamides obtained via polycondensation of at least one aliphatic dicarboxylic acid with an aliphatic or cyclic or cycloaliphatic or arylaliphatic diamine, for instance PA 6.6, PA 6.10, PA 6.12, PA 10.10, PA 10.6, PA 12.12, PA 4.6, MXD6, PA 92, PA 102, or between at least one aromatic dicarboxylic acid and an aliphatic or aromatic diamine, for instance polyterephthalamides of the type such as PA 9T, PA 10T, PA 11T, PA 12T, PA 13T or PA 6T/MT, PA 6T/6I, PA 6T/66, PA 66/6T, polyisophthalamides of the type such as PA 6I, PA 6I/6T, polynaphthalamides of the type such as PA 10N, PA 11N, PA 12N, polyaramides such as Kevlar, or a blend thereof and (co)polyamides thereof. The polyamide of the invention may also be chosen from polyamides obtained by polycondensation of at least one amino acid or lactam with itself, it being possible for the amino acid to be generated by hydrolytic opening of a lactam ring, such as, for example, PA 6, PA 7, PA 11, PA 12 or PA 13, or their blend and (co)polyamides. Types of copolyamide that may especially be mentioned include polyamide 6/66, polyamide 6/11, polyamide 6/12 and polyamide 11/12.

The diamines and diacids may bear heteroatoms. Mention may be made of 5-hydroxyisophthalic acid, 5-sulfoisophthalic acid or salts thereof; for instance the lithium, sodium or zinc salts.

Preference is given in particular to semicrystalline aliphatic or semiaromatic polyamides.

The thermoplastic polyamide resin is preferentially chosen from the group comprising: polyamide 6, polyamide 610, polyamide 66 and polyamide 66/6T.

In general, the polyamide is a semicrystalline polyamide with an apparent melt viscosity of between 0.5 and 1200 Pa·s, measured according to standard ISO 11443 at a shear rate of 1000 s$^{-1}$ at a temperature equal to 20° C. above the melting point of the polyamide, and preferentially between 0.5 and 500 Pa·s. Use may in particular be made of polyamides of variable molecular weights by addition, before or during the polymerization of the polyamide monomers, or else in melt extrusion, of monomers which modify the length of the chains, such as, in particular, difunctional and/or monofunctional compounds exhibiting amine or carboxylic acid functions capable of reacting with the monomers of the polyamide or the polyamide.

Carboxylic acid is understood to mean carboxylic acids and their derivatives, such as acid anhydrides, acid chlorides and esters, for example. Amine is understood to mean amines and their derivatives capable of forming an amide bond.

It is possible to use, at the start of, during or at the end of the polymerization, any type of aliphatic or aromatic monocarboxylic or dicarboxylic acid or any type of aliphatic or aromatic monoamine or diamine amine.

Use may very particularly be made of a polyamide obtained at least from adipic acid and hexamethylenediamine or from their salts, such as hexamethylenediamine adipate, which can optionally comprise various proportions of other polyamide monomers. To this end, polyamides 66/6T, containing various molar amounts of terephthalic acid monomer, may be mentioned.

Polyamides according to the invention may also be obtained by blending, in particular melt blending. It is possible, for example, to blend a polyamide with another polyamide, or a polyamide with a polyamide oligomer, or else a polyamide with monomers which modify the length of the chains, such as, in particular, diamines, dicarboxylic acids, monoamines and/or monocarboxylic acids. It is possible, in particular, to add isophthalic acid, terephthalic acid or benzoic acid to the polyamide, for example at contents of approximately 0.2% to 2% by weight.

The composition of the invention can also comprise copolyamides derived in particular from the above polyamides or blends of these polyamides or (co)polyamides.

Use may also be made of branched polyamides of high melt flow, in particular obtained by blending, during polymerization, in the presence of the polyamide monomers, at least one multifunctional compound comprising at least 3 identical reactive functions of amine function or carboxylic acid function type.

Use may also be made, as polyamide of high melt flow, of a star polyamide comprising star macromolecular chains and, if appropriate, linear macromolecular chains. Polymers comprising such star macromolecular chains are described, for example, in the documents WO97/24388 and WO99/64496.

These star polyamides are in particular obtained by blending, during polymerization, in the presence of the polyamide monomers, an amino acid or lactam, such as caprolactam, at least one multifunctional compound comprising at least 3 identical reactive functions of amine function or carboxylic acid function type. Carboxylic acid is understood to mean carboxylic acids and their derivatives, such as acid anhydrides, acid chlorides and esters, for example. Amine is understood to mean amines and their derivatives capable of forming an amide bond.

The present invention thus relates to a process for manufacturing a composition in which at least one polyamide, and/or monomers thereof, and a compound of formula (I) are mixed together. Said compound may be added to the already-formed or partially-formed polyamide, especially such as by placing in contact with oligomers of the polyamide, or alternatively may be added at the start of the synthesis, i.e. in the presence predominantly or totally of the monomers enabling the formation of the polyamide.

According to one variant, the mixture of polyamide, in particular polyamide powder, and compound of formula (I) is not heated to a temperature above its melting point for more than one hour.

Advantageously, in this process, the weight amount of compound of formula (I) is less than that of the polyamide or precursors thereof, in particular less than 50% of the weight of polyamide, most particularly less than or equal to 30% of the weight of polyamide, or even less than or equal to 10% of the weight of polyamide.

The polyamide compositions are generally obtained by mixing the various compounds, fillers and/or additives, especially the compound of formula (I), included in the composition, without heating or in the melt. The process is carried out at more or less high temperature and at more or less high shear force, according to the nature of the various compounds. The compounds can be introduced simultaneously or successively. Use is generally made of an extrusion device in which the material is heated, then melted and subjected to a shear force, and conveyed. According to particular embodiments, premixes, in the melt or not in the melt, of the compound of formula (I) may be prepared before preparing the final composition. It is possible, for example, to prepare a premix of the compound of formula (I) in a resin, for example of the polyamide, so as to make a masterbatch.

The compound of formula (I) may also be added in the solid phase, in particular during a post-condensation.

The composition according to the invention may comprise one or more other polymers, preferably polyamides or copolyamides.

The composition according to the invention may comprise between 20% and 90% by weight, preferentially between 20% and 70% by weight and more preferentially between 35% and 65% by weight of polyamide, relative to the total weight of the composition. The composition may comprise a polyamide content ranging from 25% to 90% by weight and especially from 30% to 70% by weight relative to the total weight of the composition.

Advantageously, the polyamide is not a polyamide modified by melting at a temperature of 180-250° C. with an organic compound containing carboxyl groups.

Advantageously, the composition is a material in solid form, i.e. it is not in the form of a solution or a dispersion. In particular, said polyamide is not soluble or dispersible in water at room temperature.

The composition may also comprise at least one reinforcing or bulking filler. Reinforcing or bulking fillers are fillers conventionally used for the production of polyamide compositions. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, such as, for example, dimethacrylate particles, glass beads or glass powder.

Preferably, reinforcing fibers, such as glass fibers, are in particular used. Preferentially, the fiber most widely used is glass fiber, of "chopped" type, having a diameter between 7 and 14 μm and a length of less than 5 mm. These fillers may have a surface size that ensures mechanical adhesion between the fibers and the polyamide matrix.

The composition according to the invention can comprise between 5% and 60% by weight of reinforcing or bulking fillers and preferentially between 10% and 40% by weight, relative to the total weight of the composition.

The composition according to the invention comprising the polyamide as defined above can comprise at least one impact modifier, that is to say a compound capable of modifying the impact strength of a polyamide composition. These impact modifiers preferentially comprise functional groups which react with the polyamide.

According to the invention, the term "functional groups which react with the polyamide" means groups capable of reacting or of interacting chemically with the acid or amine functions of the polyamide, in particular by covalency, ionic or hydrogen bond interaction or van der Waals bonding. Such reactive groups make it possible to ensure good dispersing of the impact modifiers in the polyamide matrix. Good dispersing is generally obtained with impact modifier particles having a mean size of between 0.1 and 2 μm in the matrix.

Use is preferentially made of impact modifiers comprising functional groups that react with the polyamide as a function of the acid or amine nature of the imbalance $\Delta EG=CEG-AEG$ (concentration of acid end groups CEG minus concentration of amine end groups AEG) of the polyamide. Thus, for example, if the $\Delta EG$ is "acid" (CEG>AEG), use will preferentially be made of reactive functional groups capable of reacting or of interacting chemically with the acid functions of the polyamide, in particular by covalency, ionic or hydrogen bond interaction or van der Waals bonding. If, for example, the ΔEG is "amine" (AEG>CEG), use will preferably be made of reactive functional groups capable of reacting or of interacting chemically with the amine functions of the polyamide, in particular by covalency, ionic or hydrogen bond interaction or van der Waals bonding. Use is preferentially made of impact modifiers having functional groups which react with the polyamide exhibiting a ΔEG of "amine" nature.

The impact modifiers can very well comprise in themselves functional groups which react with the polyamide, for example as regards ethylene/acrylic acid (EAA) products.

It is also possible to add thereto functional groups which react with the polyamide, generally by grafting or copolymerization, for example for ethylene/propylene/diene (EPDM) grafted with maleic anhydride.

Use may be made, according to the invention, of impact modifiers which are oligomeric or polymeric compounds comprising at least one of the following monomers or a mixture thereof: ethylene, propylene, butene, isoprene, diene, acrylate, butadiene, styrene, octene, acrylonitrile, acrylic acid, methacrylic acid, vinyl acetate, vinyl esters, such as acrylic and methacrylic esters and glycidyl methacrylate. These compounds according to the invention can also comprise, in addition, monomers other than those mentioned above.

The base of the impact modifier, optionally known as elastomer base, can be selected from the group consisting of: polyethylenes, polypropylenes, polybutenes, polyisoprenes, ethylene/propylene rubbers (EPR), ethylene/propylene/diene (EPDM) rubbers, ethylene and butene rubbers, ethylene and acrylate rubbers, butadiene and styrene rubbers, butadiene and acrylate rubbers, ethylene and octene rubbers, butadiene acrylonitrile rubbers, ethylene/acrylic acid (EAA) products, ethylene/vinyl acetate (EVA) products, ethylene/acrylic ester (EAE) products, acrylonitrile/butadiene/styrene (ABS) copolymers, styrene/ethylene/butadiene/styrene (SEBS) block copolymers, styrene/butadiene/styrene (SBS) copolymers, core/shell elastomers of methacrylate/butadiene/styrene (MBS) type, or mixtures of at least two elastomers listed above.

In addition to the groups listed above, these impact modifiers can also comprise, generally grafted or copolymerized, functional groups which react with the polyamide, such as, in particular, the following functional groups: acids, such as carboxylic acids, salified acids, esters in particular, acrylates and methacrylates, ionomers, glycidyl groups, in particular epoxy groups, glycidyl esters, anhydrides, in particular maleic anhydrides, oxazolines, maleimides or their mixtures.

Such functional groups on the elastomers are, for example, obtained by use of a comonomer during the preparation of the elastomer.

Mention may in particular be made, as impact modifiers comprising functional groups which react with the polyamide, of terpolymers of ethylene, acrylic ester and glycidyl methacrylate, copolymers of ethylene and of butyl ester acrylate, copolymers of ethylene, n-butyl acrylate and glycidyl methacrylate, copolymers of ethylene and of maleic anhydride, ethylene/propylene/diene copolymers grafted with maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and hydrogenated versions thereof.

The weight proportion of the impact modifiers in the total composition is especially between 3% and 25% and preferentially between 4% and 8% relative to the total weight of the composition.

The composition according to the invention may also comprise other additives participating in the heat stabilization of the composition, such as those chosen from the group comprising: the CuI and KI couple, hindered phenolic compounds, stabilizers bearing at least one hindered amine unit of HALS type, organic or mineral phosphorus-based stabilizers, such as sodium or manganese hypophosphite, or alternatively compounds comprising at least one polyhydric alcohol comprising from 2 to 8 aliphatic hydroxyl groups.

According to one variant, it comprises a CuI/KI content ranging from 0.1% to 1.5% by weight and especially from 0.5% to 1.2% by weight, relative to the total weight of the composition.

According to another variant, it comprises a limited or even zero content of stabilizer of CuI/KHalogen type.

The composition may also comprise a limited or even zero content of stabilizers of the type such as:
hindered phenols, and
bearing at least one hindered amine unit of HALS type.

The term "limited content" means a content of less than or equal to 0.5% by weight, especially 0.2% by weight, in particular 0.1% by weight or even 0.05% by weight relative to the total weight of the composition. Polyhydric alcohols that may thus be mentioned include those mentioned in the group comprising: diols, such as 1,5-pentanediol, 2,2-dimethyl-1,3-propanediol, triethylene glycol, poly(glycol ether)s, triols, for instance glycerol, trimethylolpropane, 2,3-bis(2'-hydroxyethyl)cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)propane-1,2-diol, 2-(2'-hydroxyethoxy)hexane-1,2-diol, 6-(2'-hydroxypropoxy)hexane-1,2-diol, 1,1,1-tris[(2'-hydroxyethoxy)methyl]ethane, 1,1,1-tris[(2'-hydroxypropoxy)methyl]propane, 1,1,1-tris(4'-hydroxyphenyl)ethane, 1,1,1-tris(hydroxyphenyl)propane, 1,1,3-tris(dihydroxy-3-methylphenyl)propane, 1,1,4-tris(dihydroxyphenyl)butane, 1,1,5-tris(hydroxyphenyl)-3-methylpentane, di(trimethylolpropane), trimethylolpropane ethoxylate, or trimethylolpropane propoxylate; polyols, such as pentaerythritol, dipentaerythritol, and tripentaerythritol; and saccharides such as cyclodextrin, D-mannose, glucose, galactose, sucrose, fructose, xylose, arabinose, D-mannitol, D-sorbitol, D- or L-arabitol, xylitol, iditol, talitol, allitol, altritol, gulitol, erythritol, threitol and D-gulonic-γ-lactone; and similar compounds.

The composition according to the invention can also comprise additives normally used in the production of polyamide compositions. Thus, mention may be made of lubricants, flame retardants, plasticizers, nucleating agents, anti-UV agents, catalysts, antioxidants, antistatic agents, colorants, mattifying agents, molding aids or other conventional additives.

According to a variant, the compositions are free of flame retardant, an in particular of flame retardant of the triazine type, especially as described in US 2008/0 146 704.

These fillers and additives may be added to the modified polyamide by normal means suited to each filler or additive, for instance during the polymerization or by melt blending.

According to a particular embodiment, the composition comprises, or even consists of:
a thermoplastic polyamide resin, in particular in a content ranging from 25% to 90% by weight relative to the total weight of the composition, and a compound of formula (I), most particularly in a content ranging from 0.5% to 3% by weight, especially from 1% to 2.5% by weight and in particular from 1.8% to 2.2% by weight relative to the total weight of the composition, represented by the formula:

$$(R_1)NH-R-(OH)_n \qquad (I)$$

in which:

n is greater than or equal to 2 and in particular n is 3 or 4; or n=1 if $R_1$ bears at least one alcohol function, R is a substituted or unsubstituted aliphatic, cycloaliphatic or arylalkyl hydrocarbon-based radical, optionally comprising heteroatoms such as N, S, O and/or P, $R_1$ may be a hydrogen atom or a substituted or unsubstituted aliphatic hydrocarbon-based radical, optionally comprising heteroatoms such as N, S, O and/or P, in particular $R_1$=H, and the alcohol functions of the compound of formula (I) represented by —OH are borne by aliphatic carbons, optionally a filler, in particular as defined above, at least one flame retardant, in particular as defined above, and/or at least one additive, in particular as defined above, these components possibly being present in contents as presented in the present description.

The polyamide compositions are generally obtained by blending the various compounds participating in the composition under cold conditions or in the melt. The process is carried out at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the molten phase during a single operation, for example during an extrusion operation. It is possible, for example, to blend granules of the polymer materials, to introduce them into the extrusion device in order to melt them and to subject them to more or less high shearing. According to specific embodiments, it is possible to preblend some of the compounds, in the melt or not in the melt, before preparation of the final composition.

The composition according to the invention, when it is prepared using an extrusion device, is preferably conditioned in the form of granules. The granules are intended to be formed using processes involving melting in order to obtain articles. The articles are thus constituted of the composition. According to a normal embodiment, the modified polyamide is extruded in the form of rods, for example in a twin-screw extrusion device, which are then chopped into granules. The molded parts are subsequently prepared by melting the granules produced above and feeding the molten composition into forming devices, for example injection-molding devices.

The composition according to the invention can be used in any process for forming plastics, such as, for example, the molding process, in particular injection molding, extrusion, extrusion blow-molding, or else rotomolding. The extrusion process may especially be a spinning process or a process for manufacturing films.

The present invention also relates to the manufacture of articles of impregnated fabric type or composite articles containing continuous fibers. These articles may especially be manufactured by placing in contact a fabric and the polyamide composition according to the invention in solid or molten form. Fabrics are textile surfaces obtained by assembling yarns or fibers which are rendered integral by any process, especially such as adhesive bonding, felting, braiding, weaving or knitting. These fabrics are also referred to as fibrous or filamentous networks, for example based on glass fiber, carbon fiber or the like. Their structure may be random, unidirectional (1D) or multidirectional (2D, 2.5D, 3D or other).

The present invention also relates to articles obtained by forming the composition according to the invention, for example by extrusion, molding, or injection molding. Mention may be made, as articles, of those used in the motor vehicle industry or the electronics and electrical industry, for example.

In particular, the articles comprise fillers, in particular reinforcing fillers, especially as defined in the present description.

The present invention also relates to articles made for applications exposed to high temperatures, especially temperatures of greater than or equal to 80° C., more particularly temperatures of greater than or equal to 110° C. and more specifically temperatures of greater than or equal to 180° C., obtained by forming a composition according to the invention.

The expression "articles made for applications exposed to high temperatures, especially temperatures of greater than or equal to 80° C." generally means articles manufactured to contain or transport fluids, i.e. liquids or gases, brought to high temperatures, for instance articles of the cooling circuit of a motor vehicle which are intended to keep the engine at an optimum and virtually constant temperature of about 100° C. These articles according to the present invention are thus defined by their applications which expose them to high temperatures; this involving their design, manufacture and intended uses based on this technical constraint in a usual mode of functioning.

According to another of its aspects, a subject of the invention is the use of articles in applications involving prolonged heating, and in particular involving prolonged contact with a hot liquid or fluid. This contact may be of the order of more than 500 or 1000 hours.

As articles subjected to high temperatures, examples that may be mentioned include the articles of the water/glycol cooling circuit, for example the radiator tank, the transfer pipe, the thermostatic tank, the degassing tank, the radiator, articles of the air circuit, for instance the turbo pipe, the air/air exchanger (intercooler), the air inlet or outlet box of the turbo cooler, the exhaust gas recycling circuit, the air intake collector and the associated pipework, the catalytic converter, the parts of the engine-fan group, the intermediate coolers, and the articles of the oil circuit, such as the cylinder head cover, the oil sump, the oil filtration unit, the distribution sump and the oil-transporting assembly pipework. These articles are well known in the field of engine-driven vehicles such as motor vehicles.

Specific terms are used in the description so as to facilitate understanding of the principle of the invention. Nevertheless, it should be understood that no limitation on the scope of the invention is envisioned by the use of these specific terms. The term and/or includes the meanings and, or and all the other possible combinations of the elements connected to this term.

Other details or advantages of the invention will become more clearly apparent in the light of the examples below, given solely by way of indication.

EXPERIMENTAL PART

Characterizations

Viscosity index as a solution of the polyamide in formic acid (IV in mL/g) according to standard ISO 307.

Acid end group (CEG) and amine end group (AEG) content: assayed by potentiometry, expressed in meq/kg.

Melting point (Mp) and associated enthalpy (ΔHf), and cooling crystallization temperature ($T_c$): determined by Differential Scanning Calorimetry (DSC), using a Perkin Elmer Pyris 1 machine, at a rate of 10° C./min.

Formulations

Before extrusion, the polyamide granules are dried to a water content below 1500 ppm. Formulations are prepared by melt-blending various components and additives in a Werner & Pfleiderer ZSK 40 twin-screw corotating extruder operating at 40 kg/h and at a speed of 270 rpm. The temperature settings in the 8 zones are respectively: 250, 255, 260, 260, 265, 270, 275, 280° C. All the components of the formulation are added at the start of the extruder. The rod having exited the extruder is cooled in a water tank and cut into the form of granules using a granulator and the granules are packaged in a heat-sealed bag. Before being injection molded, the granules are dried so as to obtain a moisture content of less than 1500 ppm.

The additives used are as follows:

Polyamide 66 Stabamid 27AE1 of IV 138 mL/g and 31AE1 of IV 175 mL/g from the company Rhodia Tromethamine (THAM) supplied by Sigma-Aldrich CuI and KI from Ajay Europe Dipentaerythritol from Perstorp "Di-penta", named DPE OCV 983 glass fiber from Owens Corning Vetrotex (35% by weight)

Examples 1 to 4

Aging in Air

The formulations prepared are injected, on a Demag 50T press at 280° C. with a mold temperature of 80° C., in the form of multifunction test pieces 4 mm thick, in order to characterize the tensile mechanical properties (tensile modulus, stress at yield, strain at yield—mean obtained on 5 samples) according to the ISO 527/1A standard and the impact mechanical properties (unnotched Charpy-mean obtained on 10 samples) according to the ISO 179-1/1eU standard at 23° C. before and after thermal aging in air.

The thermal aging ventilated in air is performed by placing the test pieces in a Heraeus TK62120 incubator regulated at 170° C. or 210° C. At various aging times, test pieces are removed from the incubator, cooled to room temperature and placed in heat-sealed bags in order to prevent them from taking up any moisture before evaluation of their mechanical properties.

The retention of tensile strength or of impact strength at a given aging time is then defined relative to these same properties before aging. The retention is thus defined as a percentage.

The formulations aged at 210° C. and the properties are collated in table 1 below:

TABLE 1

|  | C1 | 1 | 2 | 3 |
|---|---|---|---|---|
| PA 66 27AE1 (%) | 64.7 | — | — | — |
| P66 31AE1 (%) | — | 64.0 | 63.0 | 62.0 |
| Glass fiber (%) | 35.0 | 35.0 | 35.0 | 35.0 |
| THAM (%) | 0 | 1.0 | 2.0 | 3.0 |
| CuI/KI (%) | 0.04/0.26 | 0 | 0 | 0 |
| Before aging | | | | |

TABLE 1-continued

|  | C1 | 1 | 2 | 3 |
|---|---|---|---|---|
| Tensile stress at yield (MPa) | 210 | 210 | 203 | 199 |
| Unnotched Charpy impact strength (kJ/m$^2$) | 90 | 83 | 81 | 43 |
| IV (mL/g) | 141 | 117 | nm | nm |
| After aging for 500 h at 210° C. | | | | |
| Tensile stress at yield (MPa) | 148 | 178 | 217 | 207 |
| Unnotched Charpy impact strength (kJ/m$^2$) | 28 | 41 | 62 | 47 |
| Retention: ultimate tensile strength (%) | 70 | 85 | 107 | 104 |
| Retention: Unnotched Charpy impact (%) | 31 | 49 | 77 | 109 |
| After aging for 1000 h at 210° C. | | | | |
| Tensile stress at yield (MPa) | 101 | 115 | 189 | 138 |
| Unnotched Charpy impact strength (kJ/m$^2$) | 16 | 15 | 55 | 26 |
| Retention: ultimate tensile strength (%) | 48 | 55 | 93 | 69 |
| Retention: Unnotched Charpy impact (%) | 18 | 18 | 68 | 60 | nm = not measured
the percentages (%) are expressed on a weight basis

The reduction of the IV of PA 66 in the presence of THAM indicates that grafting of the THAM to the PA 66 chain has taken place. The grafted THAM is not extractable.

It is thus observed that the addition of the compound according to the invention to the polyamide allows greater retention both of the tensile and impact mechanical properties when compared with a polyamide formulation conventionally stabilized with the CuI/KI mixture.

The formulations aged at 170° C. and the properties are collated in table 2 below:

TABLE 2

|  | C2 | C3 | 4 |
|---|---|---|---|
| PA 66 27AE1 (%) | 64.7 | 63.0 | — |
| P66 31AE1 (%) | — | — | 62.0 |
| Glass fiber (%) | 35.0 | 35.0 | 35.0 |
| THAM (%) | — | — | 3.0 |
| DPE (%) | — | 2 | — |
| CuI/KI (%) | 0.04/0.26 | — | — |
| Before aging | | | |
| Tensile stress at yield (MPa) | 217 | 215 | 199 |
| Unnotched Charpy impact strength (kJ/m$^2$) | 92 | 69 | 43 |
| After aging for 500 h at 170° C. | | | |
| Tensile stress at yield (MPa) | 225 | 212 | 210 |
| Unnotched Charpy impact strength (kJ/m$^2$) | 41 | 49 | 49 |
| Retention: ultimate tensile strength (%) | 103 | 98 | 105 |
| Retention: Unnotched Charpy impact (%) | 45 | 71 | 114 |
| After aging for 1000 h at 170° C. | | | |
| Tensile stress at yield (MPa) | 192 | 203 | 206 |
| Unnotched Charpy impact strength (kJ/m$^2$) | 41 | 47 | 44 |
| Retention: ultimate tensile strength (%) | 88 | 94 | 104 |
| Retention: Unnotched Charpy impact (%) | 45 | 68 | 102 |

It is thus observed that the addition of the compound according to the invention to the polyamide allows greater retention both of the tensile and impact mechanical properties when compared with a polyamide formulation conventionally stabilized with the CuI/KI mixture, or with a polyamide formulation stabilized with DPE.

Examples 5 to 7

Fluidity Test

The formulations made are dried and then injected on a Demag 80T press in a Hasco spiral mold with an injection pressure of 1500 bar, a maintenance pressure of 1500 bar and a counter-pressure of 50 bar. The nominal temperatures in the four zones of the sheath are set at 280° C. and the mold temperature is set at 80° C. The spiral test consists in determining the comparative filling of the mold according to the formulations. The measuring unit is the spiral length in mm. The mean length is calculated over 30 spirals after setting 100 parts under the working conditions.

The formulations evaluated and the properties are collated in table 3 below:

TABLE 3

|  | C4 | C5 | 5 | 6 | C6 | C7 | 7 |
|---|---|---|---|---|---|---|---|
| PA 66 27AE1 (%) | — | — | — | — | 64.7 | 63 | 63 |
| P66 31AE1 (%) | 64.7 | 63 | 63 | 62 | — | — | — |
| Glass fiber (%) | 35 | 35 | 35 | 35 | 35 | 35 | 35 |
| THAM (%) | — | — | 2.0 | 3.0 | — | — | 2.0 |
| DPE (%) | — | 2.0 | — | — | — | 2.0 | — |
| CuI/KI (%) | 0.04/0.26 | — | — | — | 0.04/0.26 | — | — |
| Spiral test |  |  |  |  |  |  |  |
| Mean flow length (mm) | 263 | 402 | 636 | 853 | 303 | 495 | 743 |
| Standard deviation | 1.2 | 1.9 | 3.4 | 5.4 | 1.3 | 3.2 | 5.7 |

It is thus observed that the addition of the compound according to the invention to the polyamide makes it possible to very significantly increase the fluidity of the formulation.

The invention claimed is:

1. A composition, comprising:
   a thermoplastic polyamide resin, wherein the thermoplastic polyamide resin is selected from the group consisting of polyamide 6, polyamide 610, and polyamide 66;
   a compound of formula (I) or a salt thereof:

$(R_1)NH—R—(OH)n$  (I)

wherein:
   R is a substituted or unsubstituted aliphatic, cycloaliphatic or arylalkyl hydrocarbon-based radical, optionally comprising N, S, O and/or P heteroatoms, wherein the —(OH) substituents of the compound of formula (I) are borne by aliphatic carbons of the R group,
   $R_1$ is a hydrogen atom or a substituted or unsubstituted aliphatic hydrocarbon-based radical, optionally comprising N, S, O and/or P heteroatoms, and
   n is greater than or equal to 2, provided that, if $R_1$ is substituted with —OH, then n is greater than or equal to 1, and/or
   a reaction product comprising polyamide resin covalently bonded with residues of the compound of formula (I);
   wherein the composition further comprises a reinforcing filler selected from glass fibers.

2. The composition of claim 1, wherein the composition comprises:
   polyamide resin covalently bonded with residues of compound of formula (I),
   polyamide resin not bonded with a residue of compound of formula (I), and
   compounds of formula (I) not bonded with polyamide resin.

3. The composition of claim 1, wherein the mole proportion of compound of formula (I) covalently bonded to polyamide resin is between 10% and 100%.

4. The composition of claim 1, wherein n is between 2 and 20.

5. The composition of claim 1, wherein the compound of formula (I) comprises tris(hydroxymethyl)aminomethane, 3-amino-1,2-propanediol, 2-amino-1,3-propanediol, 2-amino-2-methyl-1,3-propanediol, 3-methylamino-1,2-propanediol, diethanolamine, bis(2-hydroxypropyl)amine, N,N'-bis(2-hydroxyethyl)ethylenediamine, aminopropyldiethanolamine, and/or salts thereof.

6. The composition of claim 1, wherein the composition is obtained by adding from 0.05% to 20% by weight of compound of formula (I), relative to the total weight of the composition.

7. The composition of claim 1, wherein the polyamide is a semicrystalline polyamide with an apparent melt viscosity of between 0.5 and 1200 Pa·s, measured according to standard ISO 11443 at a shear rate of $1000\ s^{-1}$ at a temperature equal to 20° C. above the melting point of the polyamide.

8. The composition of claim 1, wherein the composition comprises between 20% and 90% by weight of polyamide, relative to the total weight of the composition.

9. The composition of claim 1, wherein said composition comprises at least one impact modifier.

10. An article made by forming the composition of claim 1.

11. The article of claim 10, wherein the article is an article of the water/glycol cooling circuit, an article of the air circuit, or an article of the oil circuit.

12. The article of claim 10, wherein the article is a radiator tank, a transfer pipe, a thermostatic tank, a degassing tank, a radiator, a turbo pipe, an air/air exchanger, an air inlet or outlet box of a turbo cooler, an air intake collector and the associated pipework, an article of the exhaust gas recycling circuit, a catalytic converter, a part of the engine-fan group, an intermediate cooler, a cylinder head cover, an oil sump, an oil filtration unit, a distribution sump or oil-transporting assembly pipework.

13. A process for making a polyamide composition according to claim 1, comprising mixing at least one polyamide, and/or precursors thereof, with a compound of formula (I).

14. The composition of claim 1, wherein the compound of formula (I) comprises tris(hydroxymethyl)aminomethane or a salt thereof.

15. A polyamide composition made by the process of claim 13.

16. A method for stabilizing and/or improving the fluidity of a polyamide resin, comprising adding a compound according to formula (I), and/or a salt thereof:

$$(R_1)NH\text{---}R\text{---}(OH)n \qquad (I)$$

wherein:
R is a substituted or unsubstituted aliphatic, cycloaliphatic or arylalkyl hydrocarbon-based radical, optionally comprising N, S, O and/or P heteroatoms, wherein the —(OH) substituents of the compound of formula (I) are borne by aliphatic carbons of the R group,
$R_1$ is a hydrogen atom or a substituted or unsubstituted aliphatic hydrocarbon-based radical, optionally comprising N, S, O and/or P heteroatoms, and
n is greater than or equal to 2 or, if $R_1$ is substituted with —OH, is greater than or equal to 1,
and a reinforcing filler selected from glass fibers, to the polyamide resin and/or a precursor thereof.

17. A process for making a polyamide composition, comprising mixing at least one polyamide resin selected from polyamide 6.6, polyamide 6.10, polyamide 6, their blends, and their (co)polyamides, and a reinforcing filler selected from glass fibers, with a compound according to formula (I):

$$(R_1)NH\text{---}R\text{---}(OH)n \qquad (I)$$

wherein:
R is an aliphatic radical,
$R_1$ is a hydrogen atom or an aliphatic radical, which may optionally be substituted with —OH, and
n is greater than or equal to 2 or, if $R_1$ is substituted with —OH, is greater than or equal to 1,
and/or a salt thereof.

* * * * *